United States Patent [19]
Calabro et al.

[11] 3,900,842

[45] Aug. 19, 1975

[54] REMOTE AUTOMATIC METER READING AND CONTROL SYSTEM

[75] Inventors: Salvatore R. Calabro, Belleville, N.J.; John A. Calabro, Forest Hills, N.Y.; Peter R. Mich, East Orange, N.J.

[73] Assignee: Automated Technology Corporation, Hackensack, N.J.

[22] Filed: Dec. 26, 1973

[21] Appl. No.: 427,724

Related U.S. Application Data

[63] Continuation-in-part of Ser. No. 346,167, March 29, 1973, abandoned.

[52] U.S. Cl. .......................... 340/310 A; 340/146.1 C
[51] Int. Cl. .......................... H04m 11/04
[58] Field of Search .......................... 340/310 A

[56] References Cited

UNITED STATES PATENTS

| | | | |
|---|---|---|---|
| 3,264,633 | 8/1966 | Hellar | 340/310 A |
| 3,359,551 | 12/1967 | Dennison | 340/310 A |
| 3,626,297 | 12/1971 | Green | 340/310 A |
| 3,702,460 | 11/1972 | Blose | 340/310 A |
| 3,729,710 | 4/1973 | Sherwin | 340/310 A |

*Primary Examiner*—Thomas B. Habecker
*Attorney, Agent, or Firm*—Sommers & Sommers

[57] ABSTRACT

A system for remote reading of data measured by consumption meters, utilizing encoded low power telemetry signals in the milliwatt range superimposed upon a power transmission network. This utilizes unique transmission and filtering techniques which insure the signal passing through power network system components, such as transformers, capacitors, voltage regulators, etc. without the necessity for by-passing by tailored circuitry. Individual meters at field points include means for translating the meter reading into appropriate binary code form and for coupling signals indicative of such data to the power network. A satellite unit gathers, processes and re-transmits the said data to a central station. The central station receives and transmits encoded meter data as required, and provides an error-detection and correction capability. An adaptive coding subsystem varies the coding scheme utilized in the present system in accordance with varying data transmission and network conditions. The system can also be used to monitor parameters such as temperature, pressure, etc. by interrogating appropriate transducers and transmitting the data over the same power network as is used for meter reading. It is also capable of transmitting signals for switching and shedding loads as required by the supervisory discipline.

7 Claims, 5 Drawing Figures

REMOTE AUTOMATIC METER READING AND CONTROL SYSTEM

BACKGROUND OF INVENTION

This application is a continuation-in-part of our co-pending patent application, Serial No. 346,167, filed March 29, 1973 and now abandoned, for TELEMETRY SYSTEM CONFIGURATION AND TECHNIQUES TO INSURE OPERATION OF ELECTRIC POWER DISTRIBUTION NETWORK AS A COMMUNICATION MEDIUM FOR REMOTE METERING AND MONITORING AND CONTROL FUNCTIONS, which application is assigned to the assignee of the present application.

This invention relates generally to system and apparatus for measuring and monitoring consumption of energy and similar commodities provided by utilities or the like, and more specifically relates to a system of this type which enable centralized reading, monitoring and/or control of field positioned member units.

Consumption of such commodities as electricity, water, gas, oil, heat and similar supplies as are provided to home and industrial consumers, is commonly measured by means of a meter installed at the consumer's premises. It is a matter of common observation that by and large the techniques used to read said meters and/or in other respects monitor or control use of the said commodities, have not substantially changed over the course of at least half a century. Most commonly, in particular, agents are periodically dispatched by the suppliers of the commodities, which agents make periodic readings of the meters for purposes of billing the individual customers, or otherwise monitoring consumption of the commodities. Within recent years this basic approach has been somewhat modernized by use of meter apparatus and systems which are capable of providing digitally or other encoded outputs. Such outputs, at least theoretically, may be provided to a collection point, thereby to some extent simplifying the meter reading operations. Modern commercial and social conditions, on the other hand, have created an increasing demand for yet further automation of the type of operations referred to herein. Not only, for example, do the conventional methods of reading individual meters or otherwise individually collecting data, tend to create inordinate labor costs; but moreover in many instances the meters sought to be read are located in high crime areas, or in hazardous or relatively inaccessible industrial zones, whereby it would be highly desirable to eliminate requirements for on-site observation of the device in question.

In the foregoing connection it may be noted that proposals have been made in the past, whereby data provided by meters or the like might be transmitted to a central location, such as the offices of the utility furnishing the commodity, thereby eliminating the need for direct observation. In some instances, proposals of this type were based upon providing individual radio transmitters at the meter locations. Such approach, however, involves a relatively complex and expensive installation and operation, and by its nature is relatively undependable. It has also been proposed in the past, both for purposes such as discussed herein, and as well for various other signal transmission purposes, to utilize the pre-existing power networks for transmitting data indicative of such information as is discussed herein. Such approach, however, has not found general acceptance in the past, even though seemingly attractive. Various reasons can be ascribed to the apparent failure of such approach to achieve past commercial acceptance. Among such reasons is the fact that the systems previously conceived were so subject to erroneous readings that they tended to create almost as many problems as they solved. In short, their dependability and performance levels were simply inacceptable. Moreover, such past systems used high power levels measured in watts and also required by-passing system components such as transformers and voltage regulators etc. with appropriate circuitry to accommodate the transmitted signal.

In accordance with the foregoing, it may be regarded as an object of the present invention to provide a system utilizing existing electric power networks, which enables remote reading of consumption meters or the like, which uses low power levels in milliwatts and does not require by-passing of power network components, and which provides high dependability and accuracy in the readings thereby obtained.

It is a further object of the present invention, to provide a system utilizing the electrical power distribution networks of a community, which enables readouts to be obtained on command from meters positioned at remote locations, thereby measuring consumption of commodities such as electric power or the like; and which, further, enables use of the said power network for controlling the distribution and dispensation of the commodities cited.

SUMMARY OF INVENTION

Now in accordance with the present invention, the foregoing objects and others as will become apparent in the course of the ensuing specification, are achieved in a system including a plurality of meters located at various remote field points, each meter including means for translating the reading thereof into suitable digitally encoded form, as for example, optical encoding means. The encoded signals from the meters are provided to a suitable carrier, and thereupon coupled to the power network. Satellite units also coupled to the said network, gather, process and re-transmit meter reading data as required to a central control station. The latter station receives and transmits encoded meter data, as required, and also provides error detection and correction capability. A sub-system may be present at the said central station, which enables an adaptive coding scheme by continuously examining the power network transmission characteristics, and directing employment of coding schemes for data transmission, which yield optimal transmission of information throughout the network.

BRIEF DESCRIPTION OF DRAWINGS

The invention is diagrammatically illustrated, by way of example, in the drawings appended hereto, in which.

DESCRIPTION OF PREFERRED EMBODIMENTS

Figure 1:
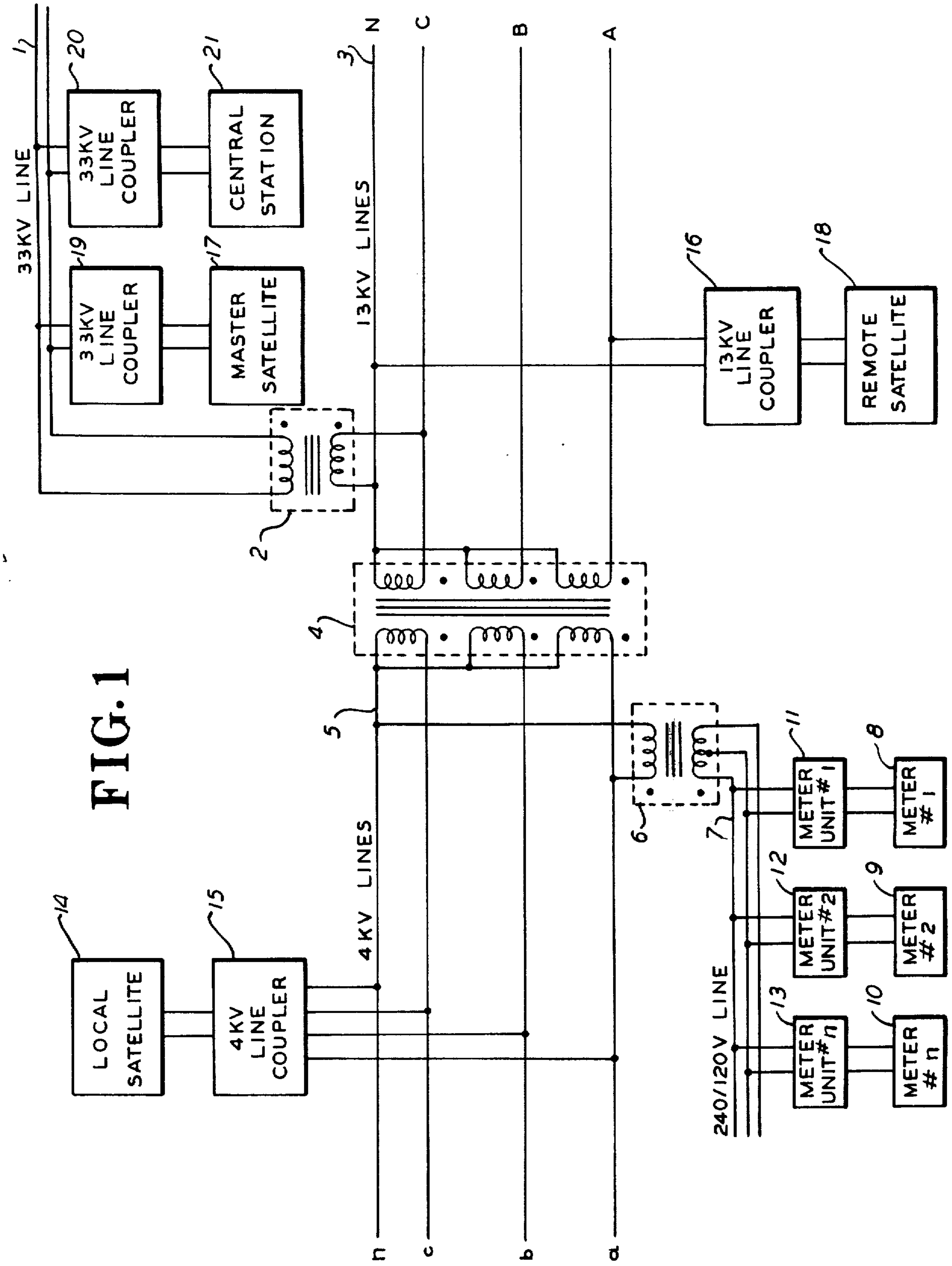
FIG. 1 is a schematic block diagram of a consumption system in accordance with the present invention, wherein the encoded or telemetry signals are superimposed upon a conventional power line network.

In FIG. 1 herein, a schematic block diagram appears of a typical consumption system, in accordance with the present invention. The system to be described is based upon use of a typical power distribution network beginning from a high voltage of 33 KV at a frequency $f_n$, for example, of 60 Hz for a three phase, four wire distribution network (either Δ or Y connection plus neutral), forming part of a utility electric company supply, and hereinafter referred to as the network or mains. It should be understood in this connection that the power network discussed is representative of systems in widespread current use, but the present invention need not in any way be delimited to the specified parameters mentioned, i.e. with respect to potentials, frequencies, or so forth.

The network 1 in FIG. 1 in accordance with the foregoing, may thus constitute a high voltage distribution network at 33 KV, which feeds a network 3, a 13 KV feeder, through stepdown transformer 2. Network 3, in turn, feeds a network 5 which, for this example, is at potential of 4 KV, through step-down transformer 4. Polarities for the various transformers are indicated by conventional notation.

In turn, network 5 feeds a network 7 through step-down transformer 6. Network 6, finally feeds the customer energy requirements, either at 240 or 120 volts. Meters No. 1, No. 2, No. 3 etc. are designated by blocks 8, 9, 10 etc., up to meter No. $n$ shown by reference numeral 10. These meters measure the amount of energy consumed by each customer connected to transformer 6. This is typical of a configuration utilized for any number of transformers connected to network 5, together with the associated number of meters they serve. Meters 8, 9 and 10 are equipped with encoding and transmitting meter units No. 1, No. 2 etc. through No. $n$, respectively designated by the block reference numerals 11, 12 and 13. These meter units serve to encode the readings of meters 8, 9 and 10, etc., and transmit the information over the various networks. Specifically such transmission is effected through transformer 6 to the 4 KV line coupler 15, and local satellite 14; through transformer 4 to 13 KV line coupler 16 and to remote satellite 18; and through transformer 2 to 33 KV line coupler 19 and master satellite 17; and to 33 KV line coupler 20 and central station 21.

Local satellite 14 stores the readings of the multitude of meters to which it is connected. On the average, a local satellite may handle about 500 meters. Upon request from central station 21, local satellite 14 transmits each encoded meter reading, in the order requested, through the various system elements as heretofore described. The master satellite 17 acts as a control and collection station for a number of remote satellites 18 to which it is connected. The remote satellites 18 in a similar fashion perform the same function for local satellites 14. Upon interrogation by central station 21, master satellite 17 sends its readings via 33 KV line coupler 19 on to the 33 KV line through 33 KV line coupler 20, thence to central station 21.

The use of local and remote satellites in the present environment serves a number of significant functions. The technique, for example, reduces the distance that the signal must travel from a given subscribed meter to central station 21, by virtue of the intermediate collection and distribution points enabled through the said satellites. In practice, optimum locations of satellites are established by utilizing sequential testing methods, the objective being to locate the satellite in areas which minimize the effects of noise and attenuation. A specific procedure that may be utilized is as follows: An initial location is determined from an analysis of line diagrams. This is done by selecting a location, which from a physical viewpoint appears to be centrally and optimally located. The satellites then are located and tests from various peripheral areas are made using test sets. A sequential test plan is utilized for this purpose with the objective being one of obtaining specified confidence levels that the satellite has been properly located. Requirements of the test plan are such that the satellite location is selected to assure the most favorable signal-to-noise ratios and data rates which can be used with a minimum of transmitter power from each meter that is connected to the satellite through its service transformer, and attendant power line.

Another advantage of using satellites in the present system is one of increasing the entropy of the system. This is accomplished because a lesser number of addressing and error detection and correction bits are required to insure the integrity of communications. The addressing bits are reduced because an orderly array of shift registers in the satellites referenced to a "look-up table" in the central station computor is capable of identifying the meter. A reduced number of error correction and correction bits are possible because of the relatively short distance from the subscriber meter to the satellite, thus improving the signal-to-noise ratio, while providing a facility for greater data rate, which, in turn reduce the probability of an error. If satellites were not used all of these advantages would not be available because the power distribution system is inherently noisy and the distance that a signal can be sent without excessive contamination and signal destruction is limited. The noise spikes occur at random times, their amplitude and frequency being due to man-made, as well as natural causes. Consequently the high level noise usually is of sufficient amplitude that it destroys one or more bits of data when these are being transmitted. In this case a considerable amount of coding must be appended to each burst of data to insure that an error can be detected and corrected. This means that the degree of error coding that is placed on each transmitted word is a function of the signal-to-noise ratio and data rate.

Since it is recognized that the high level noise is either of a periodic or random nature such as that generated by induction motors with electronic speed controls, arc welders, punch presses or any periodic intervals, corrective action is taken through synchronization methods to overcome the effects of this periodic noise. This is done by operating the data rate synchronously with the 60 Hz frequency at a part of the cycle where noise is at a minimum and where filtering and noise cancellation techniques can be taken advantage of; in other words, recognizing that the noise is not random and can be handled accordingly. When the noise is random in nature, the probability, on a per-bit basis, of a noise pulse occurring is relatively low and the number of bits that will be transmitted between noise pulses is correspondingly high. Therefore the probability of an error due to bits being destroyed by the noise pulses under these conditions is relatively low. The probabilities involved have been found to conform to the Poisson Distribution. This has been verified by analyzing data resulting from a line testing program where it was found that the average number of bits destroyed, also called the expectation, appears to be a constant which is a requirement for the Poisson Distribution. The end result of the probability of a word error is of an exponential nature as the following development indicates:

let $P_e$ = probability of a bit error $n$ = number of bits in a word $nP_e$ = average number of bit errors (expectation) / word =

$P_{we}$ = probability of a word error $p(o) = e^{-nP_e}$ = probability of zero bit errors $P_{we} = 1-p(o) = 1-e^{-nP_e}$ = probability of 1 or more bit errors However, since 1 or more bit errors will result in a word error, the probability of a word error $P_{we}$ by substitution is:

$$P_{we} = 1 - e^{-n(K_1 e^{-S/K_2 N})},$$

since $P_e = K_1 e^{-S/K_2 N}$

From the preceding relationship it is seen that a double exponential or log log relationship exists between the probability of a word error, the number of bits per word and the signal-to-noise ratio. Since additional error coding bits are necessary, in the event of a decrease of signal-to-noise ratio, and in order to maintain a low value of $P_{we}$, the end effect is to slow down the total read time. In other words, if each word from each meter becomes three times as long due to the coding, the total amount of time to read the meters is also tripled. Therefore, another objective is to improve the coding efficiency. This is the ratio of message digits to the sum of message digits plus check or parity digits.

Figure 2:
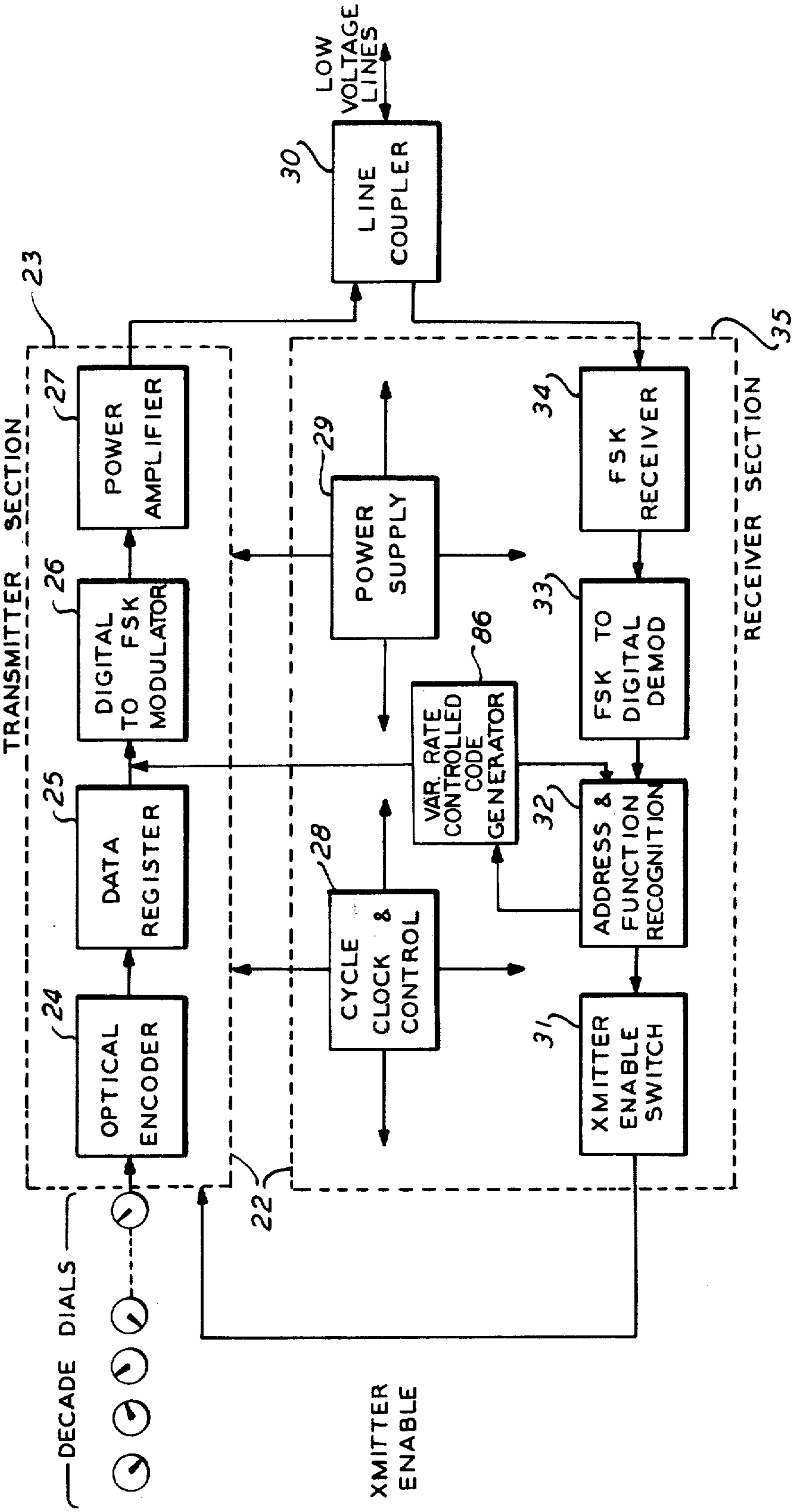
FIG. 2 is a schematic block diagram of the meter unit used in the FIG. 1 system, and illustrates the principal elements enabling data transmission and reception.

FIG. 2 is a schematic block diagram of the encoding and transmitting meter unit 22. Such unit 22 corresponds to one of the meters depicted at reference numerals 11 through 13 in FIG. 1. Meter unit 22 receives commands from central station 21 of FIG. 1, which direct the said unit to transmit the encoded meter readings through a transmitter section 23. The decade dials and optical encoder 24 shown feeding data into transmitter section 23 may correspond to the optical encoder disclosed in U.S. patent application Ser. No. 314,391, filed Dec. 21, 1972 for POLYDECADE DECIMAL TO DIGITAL ENCODER, which application is assigned to the assignee of the present application. As described in the referenced patent application, the optical encoder functions as to pass or obstruct a beam of light emanating from a suitable source, the presence or absence of such light being sensed by a sensing device in accordance with the configuration of transparent and opaque areas existing on an encoder wheel. The resulting electrical pulses emanating from the light sensing device constitute an original modified gray code which is representative of the meter reading in encoded form. It will, however, be understood that encoders other than that specifically referenced here, can be utilized to provide the inputs to data register 25 in transmitter section 23.

Specifically, therefore, transmitter section 23 includes the optical encoder 24, which serves to convert the analog pointer positions of each meter decade to a non-ambiguous modified gray code, and sends these to data register 25 — of conventional construction. The data register also contains previously provided meter address. The data in register 25 is then fed to the parity generator which supplies the message to be transmitted to the digital-to-frequency shift keying (FSK) modulator 26, which generates three frequencies, i.e. a carrier frequency $f_o$, a mark frequency $f_m$, and a space frequency $f_s$ on a return to zero basis. This means that each time an $f_m$ or $f_s$ frequency is generated, $f_o$ appears as a reference before either $f_s$ or $f_m$ is again generated and transmitted. The $f_m$ frequency is generated whenever a logic 1 appears, and a $f_s$ whenever a logic 0 is evident, or vice versa. The difference in frequency $\Delta f$, between either $f_o$ and $f_s$, or between $f_o$ and $f_m$ is adjusted to maintain the best system response. The frequencies from ditigal-to-FSK modulator 26 are then fed to power amplifier 27, and from there to the low voltage line coupler (LVLC) 30, which couples the transmitted signal to the power wiring — e.g. the building in which meter unit 22 is present. A cycle clock and control 28 maintains the proper timing relationship among the signals involved, and a power supply 29 furnishes the necessary electrical potential to power the meter unit circuits.

Receiver section 35 of meter unit 22 consists of FSK receiver 34, FSK-to-digital demodulator 33, error detector, address function and recognition circuits 32, and transmit enable switch 31. Upon interrogation from central station 21, FSK receiver 34 receives the signal which is then converted from FSK to digital form at FSK-to-digital demodulator 33. This digital signal is then recognized by address and function recognition circuits 32, which activates transmit enable switch 31 if the received signal contains the proper address. This action enables transmitter section 23, which then sends the requested data back to central station 21. Address function and recognition circuits 32 also provide an output to code generator means 86. The latter provides appropriate codes to digital-to-FSK modulator 26; its function will be further described hereinbelow in connection with FIG. 5.

Figure 3:
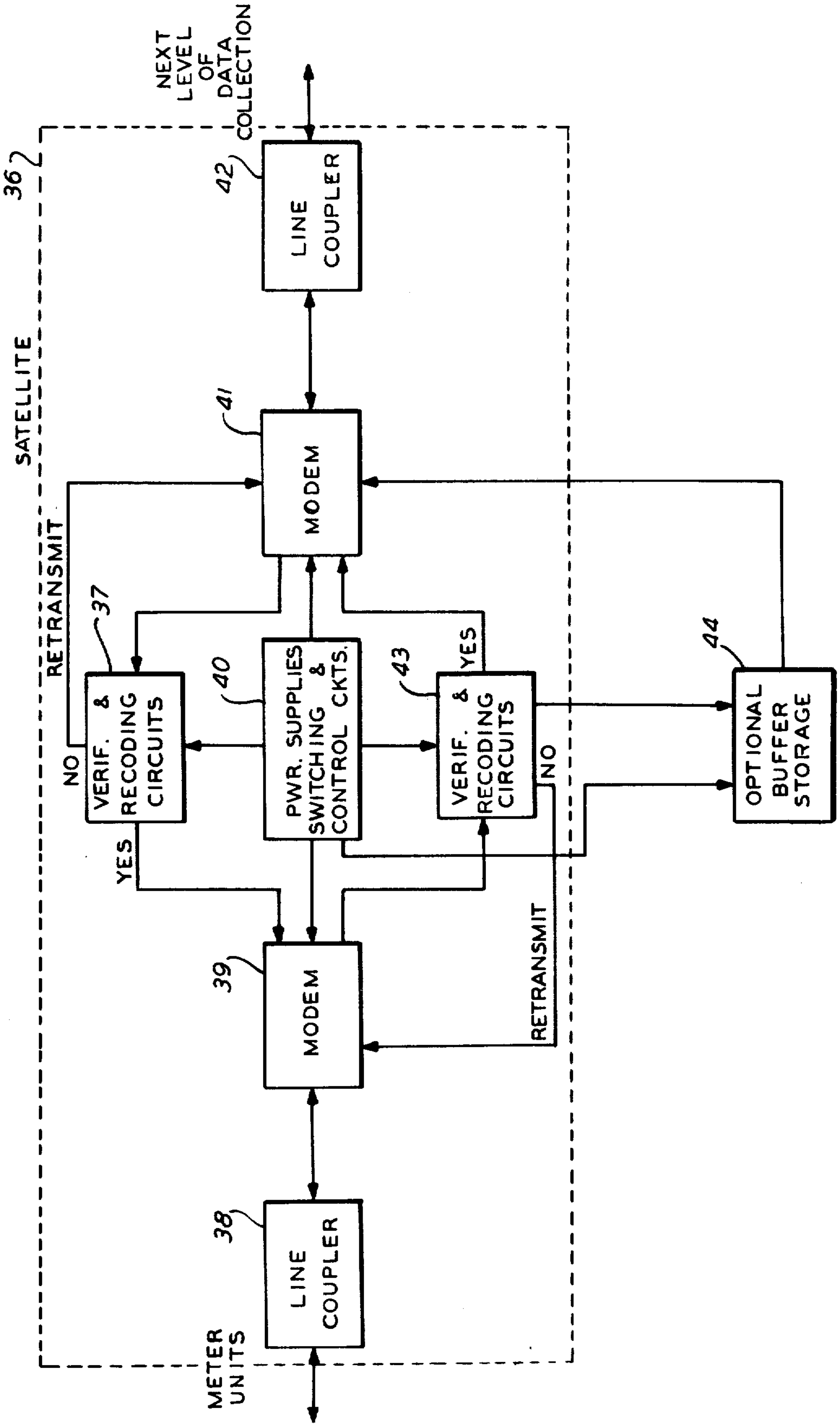
FIG. 3 is a schematic block diagram illustrating the local and/or remote satellite utilized in conjunction with the FIG. 1 system.

FIG. 3 is a schematic diagram of satellite unit 36. This can be called either a "local" or a "remote" satellite — i.e. satellites 14 or 18 of FIG. 1. It is termed "local" when it is near or adjacent to the master satellite which it services; and "remote" when it is physically distant from the master satellite 17, but electrically connected to it via a medium-voltage or high-voltage line. The term "slave" satellite for either the local or remote satellite is used to indicate the "slave" satellite is responsive to the commands of the master satellite when one is in use between the "slave" satellite and central station. A "slave" satellite functions as follows: The coded signal from a meter unit passes through line coupler 38 and modem 39 to verification and recording circuits 43 which determine whether or not an error exists in the coding of the received signal. If an error does exist i.e. the received signal is not correct as indicated by a "no" at an output of verification and recording circuits 43, a signal is furnished to modem 39 requesting a retransmission of the data. If two out of three retransmissions agree (or whatever criteria is selected), the signal accuracy is assumed verified and the signal is then recoded and transmitted to modem 41, thence to line coupler 42 to the next level of collection which may be either a master satellite in a large installation or the central station itself for a small installation. On the other hand, if the original coded signal is verified on the first transmission as indicated by a "Yes" at an output of verification and recoding circuits 43, the signal is recoded and sent to modem 41, line coupler 42, and the next level of collection as before.

From the interrogation viewpoint, a coded signal emanates from central station 21 seeking the reading of a specific meter. This signal includes both the meter address and the necessary parity bits for verification. It travels through line coupler 42, modem 41, and verification and recoding circuits 37, respectively. As before, if the coded signal received is verified it is recoded and sent on through modem 39 and line coupler 38 to the meter unit. If the coded signal is not verified immediately, as indicated by a "No," a retransmission is called for. If (e.g.) two out of the three retransmissions agree, the message is recoded and sent to the modem units as before, through modem 39 and line coupler 38.

Optional buffer storage unit 44 stores data from the discrete population of meters serviced by the satellite. In this manner the number of meters that can be read in a given time period is vastly increased since each satellite has its own buffer storage.

In order to retrieve high resolution data over noisy information channels error coding is required. In the use of PLT where a severe noise environment exists noise must be carefully accounted for. By the term "PLT," is meant Power Line Transmission, i.e. the system of sending encoded signals over power lines. The transmitted data is of a digital nature and it is further assumed that the power distribution network forms a binary symmetric channel (BSC). Where the (BSC) has the property that in the presence of random noise the transition probability of a zero to one is:

$$q_o < ½$$

and both symbols have equal transition probabilities.

The noise can be characterized as a combination of burst type noise and noise randomly distributed in amplitude and frequency. The burst noise is considered to be of sufficient amplitude and frequency to damage the data during the burst interval in such a way that each bit has equal probabilities of being reversed. Therefore if the duration of a burst is t seconds and the code rate is R bits/sec. the probability of x errors occurring is:

$$p(x) = \binom{Rt}{x} p^{Rt-x} q^{x}$$

$$\text{where } \binom{Rt}{x} = \frac{(Rt)!}{(Rt-x)!\ x!}$$

since $$p = q = ½$$

$$p(x) = \left(\frac{(Rt)!}{(x)!\ (Rt-x)!}\right)(½)^{Rt}$$

admits to the possibility of long runs of errors in sequence requiring certain attention be given to corrective coding to insure the detection and correction of this type of error.

Random errors occuring on the power distribution system can be considered to be of a narrow band nature since the signals are propagated along a linear transmission path and received through linear narrow band filters. An abundance of literature exists on the transitional probabilities of digital data in this environment.

Generally the transition probability is expressed as the probability of a bit error occurring:

$$P_e = ½e^{-\gamma/2} \text{ (non coherent FSK)}$$

where: $\gamma$ = signal to noise power ratio = S/N

Since noise power is proportional to bandwidth, and bandwidth is proportional to data rate;

$$P_e = (½)e^{-S/KDR}$$

K = Constant indicating that $P_e$ can be controlled by not only signal level but data rate.

The literature discusses extensively the theoretical limits on binary information transfer in the presence of noise on a bandwidth limited channel. Shannon's "coding theorem" states that every channel has a definite capacity C and for any code rate R such that when $$R<C$$

and length n there exists a coding scheme such that $$P(E) \leq e^{-nE(R)}$$

where $E(R)$ is a positive function of R.

$R$ = information bits/information bits + coding bits)

Since this relationship only demonstrates the existence of codes capable of good performance in noise, and not the actual codes themselves, it is difficult to quantitatively analyze information entropy as a function of line noise.

Figure 4:
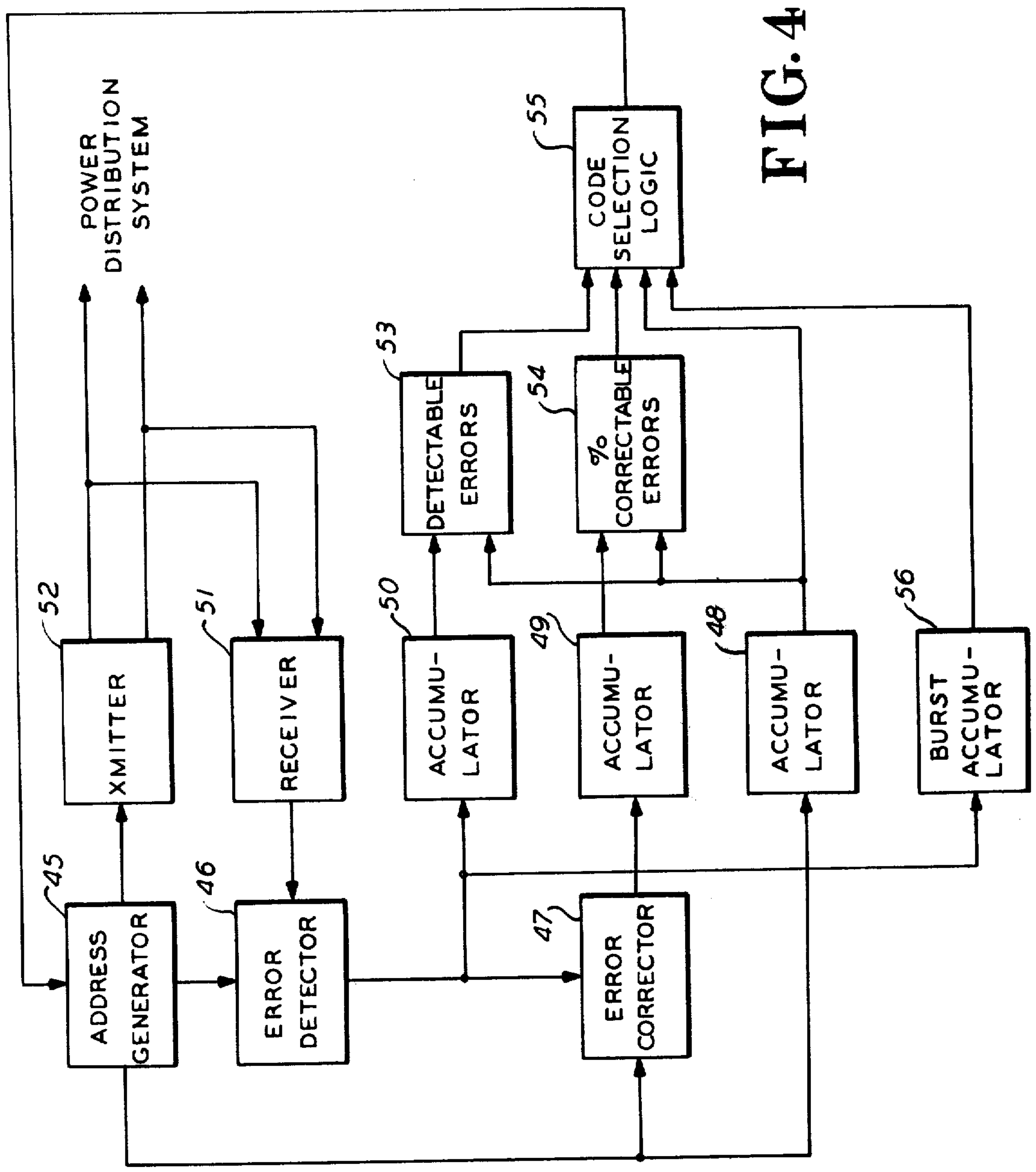
FIGS. 4 and 5 are schematic block diagrams of portions of the central station appearing in FIG. 1, and depict the principal elements enabling the adaptive encoding utilizable in the system.

FIG. 4 shows a block diagram of a method that allows information entropy to be monitored and controlled in a fashion that allows the system to transfer information at rates approaching optimum for the various codes available in the system code repertoire.

FIG. 4 depicts the system of the invention from a coding viewpoint. The Figure represents a portion of central station 21, as previously discussed, that is used in an automatic diagnostic mode. The address generator scans a portion of all of the meters causing them to respond as in the normal read mode. The returning message is processed independently for purposes of evaluating entropy. This adjunct to the system allows it to operate in conventional modes while evaluating entropy and error performance simultaneously.

In particular the address generator 45 provides the meter address to be read to transmitter 52, which in turn contacts the meter to be interrogated. The return data from the meter (e.g. from meter unit 22 of FIG. 2) is decoded in receiver 51 and the returned address is sent to error detector 46 where it is compared against the transmitted address provided by generator 45. Errors are detected by the error detector 46, which makes a bit by bit comparison of the two words. Error counts are sent to the error detector accumulator 50.

Burst errors, i.e. errors having a string of sequential bits in error are noted and the total number of bits are accumulated in the burst accumulator 56. Once the error detector has made a determination that an error exists it transfers the word to the error corrector 47 which in turn attempts to correct the error. The success or failure of error corrector 47 to do this is directly measurable. If the error corrector is in error this is recorded and stored in the error corrector accumulator 49. Each request sent to a meter is accumulated in this address accumulator 48.

Since the salient characteristics being evaluated are the ratios of detectable errors and correctable errors, the % detectable errors and % correctable errors are calculated by means 53 and 54. After a sample has been taken that has statistical significance, the four available inputs are provided to the code selection logic 55.

The function of logic 55 is to make optimizing decisions in the light of available data, the criteria being that of yielding a maximum information rate while maintaining the undetected error rate at some preestablished value. Having effected such decision, direction is then provided through the power distribution system to meter unit 22 (FIG. 2) where the control information is detected at code generator means 86, which cause unit 22 to select among a repertoire of encoding schemes that mode of operation deemed optimal for network conditions. Logic 55 thus directs operational changes in the mode of data transmission, depending upon the nature of the four inputs provided to such logic. For example, if the undetectable error rate is satisfactory, but the number of erroneous messages not capable of correcting appears high, necessitating retransmissions, a decision can be made at logic 55 and tested, to either change the error coding or data rate. The simplest technique pursuant to which changes in mode of data transmission may be thus effected, involve a simple changing of the rate of data transmission at the meter unit. This is effective for removing various types of deficiencies; for example, burst noise of fixed average duration has a lesser effect on code words when the data rate is reduced for a given coding scheme. Similarly the influence of random noise can be lessened by reducing the receiving bandwidth, which necessitates a slower data rate.

Other techniques of changing the mode of transmission are, however, utilizable in accordance with the invention. For example, a stored file of codes may be provided at the meter unit 22, and accessed to select one in which the coding efficiency is different; e.g. a linear block code may be selected that has greater error correcting capacity. This causes a lesser number of "call backs" thus improving the quantity of usable information transmitted. Similarly, as burst noise is known to be correctable and detectable with relatively high coding efficiencies provided that the word length is long, codes such as fire codes, interlaced codes, and phased burst error correcting codes, may be included in the repertoire of encoding schemes available at meter unit 22. It should further be understood that various combinations of the encoding schemes cited (and of others as are known in the art) may be utilized to transmit successive portions of the meter data, depending upon the network conditions as continuously observed by the portions of central station 21 which are discussed in connection with FIG. 4.

Figure 5:
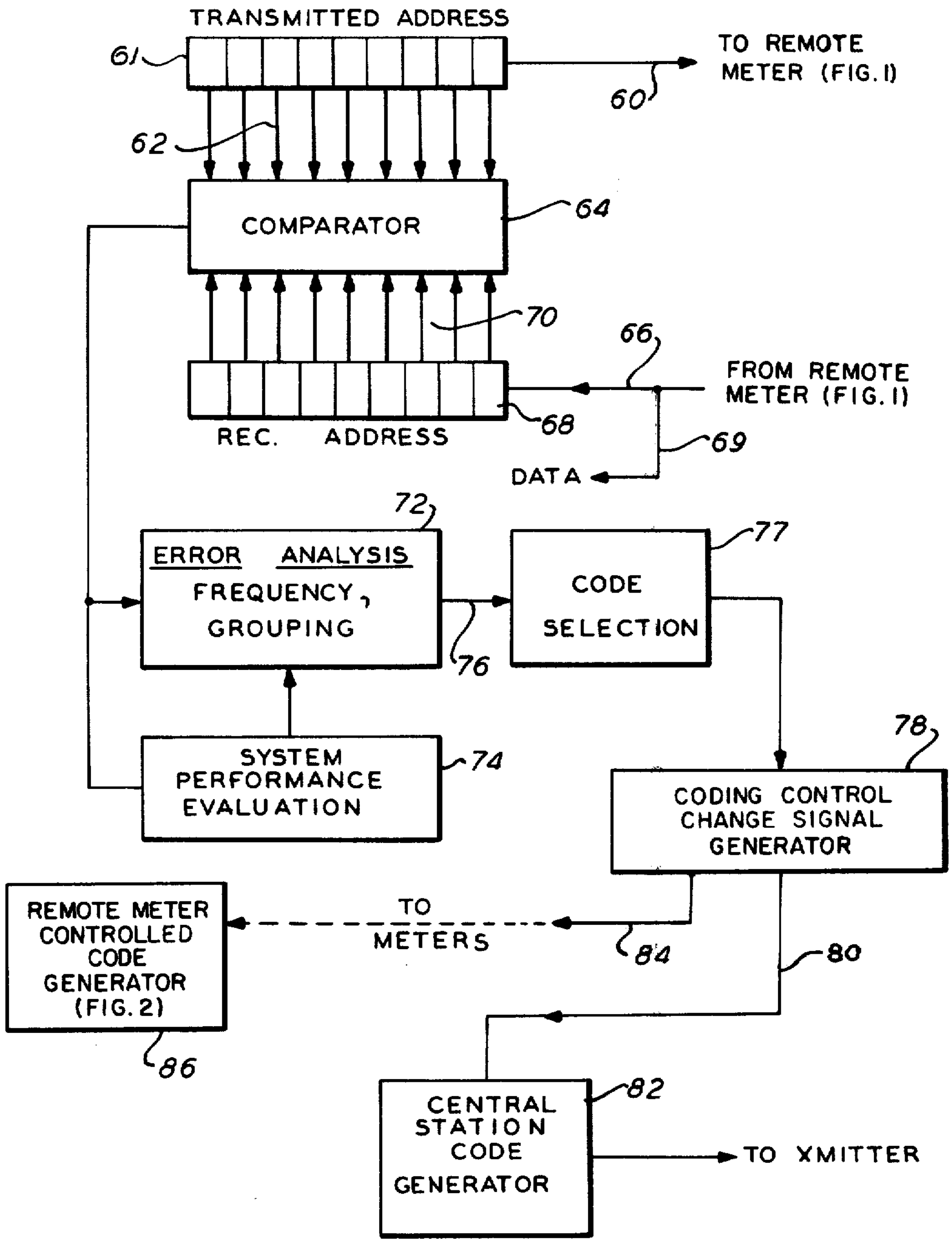

In FIG. 5 the processes occurring at central station 21 which provide optimization in the mode of data transmission, are further analyzed. The schematic showing thus illustrates the address transmitting means 61 providing an output to the line 60, representing the address of a given meter. This output ultimately proceeds to an individual meter, such as that shown at blocks 8, 9, or so forth, in FIG. 1. The various bits which define the said address are also provided via parallel outputs 62 to the comparator means 64. The meter in question, responding to receipt of its address, provides its own pre-stored address through the line 66, to address-receiving means 68. The latter then, through the parallel outputs 70, provides to comparator 64 the bit representation of its address. Remaining meter data is taken off at 69.

Comparator means 64 compares the two addresses and provides outputs to error analysis means 72, and to system performance evaluation means 74. As has been previously discussed in connection with FIG. 4, error analysis means 72 examines such factors as the grouping of errors, their frequency, etc.; while system performance evaluation means 74 examines the comparator output from a viewpoint of overall system performance — which is to say, examines such factors as the overall efficiency of data transmission, etc. In accordance with the characteristics thereby detected, a result signal is provided in line 76 to a code selection means 77, which, depending upon the nature of the result signal directs adjustment of the mode of data transmission throughout the system. Specifically, for example, selection means 77 may direct that changes be effected in the data transmission rate, or in the types of codes, word lengths, etc., which are utilized.

The mode of transmission thus directed for use is implemented by coding change message generator 78, which provides an output signal in line 80 to central station code generator 82. By way of example, a signal in line 80 may proceed from generator 78, directing code generator 82 to double its rate of data output, or otherwise change the mode of transmission. At the same time a signal is provided from coding change message generator 78 through the line 84, and the power transmission system, to the individual meters, and thereby to the meter code generator means such as that illustrated at reference numeral 86, one such means 86 being associated with each meter. Generator means 86 performs a similar function at the remote meters, as does the corresponding generator 82 at the central station, which is to say it provides changes in the mode of data transmission in accordance with the control signal provided from coding change message generator 78.

The present invention has been largely described in terms of its application to the remote reading of consumption meters or the like. It should, however, be understood that the invention is equally applicable to the remote reading of meters or other devices, which are associated with measuring of other quantities than consumption. For example, meters as may be utilized to measure flow rates of energy dissipation, as well as meters and/or instruments as are used for indicating or detecting other observable conditions are equally applicable for use with the invention. It may also be pointed out that the present system can be readily modified to enable additional functions other than those heretofore discussed: for example, where the system is utilized with a plurality of remotely positioned power consumption meters, the remote meters may include means enabling the central station to effect auxiliary operations at the remote points, most notably the shedding of the power loads at one or more selected remote points. In this type of operation the central station may, under prescribed conditions, transmit signals to the remote meters directing that power be disconnected at the selected points, in order to protect a community against the emergencies which could otherwise occur where power becomes of short supply. It will also be evident to those skilled in the art that by use of appropriate computer programs one may readily process the various meter readings to perform a power profile analysis for the entire power network, or for any desired segments thereof.

The system may further be used for monitoring, controlling and switching power network components, such as relays, circuit breakers, capacitors, generators, etc., where each of the components are provided with separate addresses and circuitry for actuating switching devices as required, in accordance with signal transmitted and received in the same manner as if these components were the meters heretofore described.

In like manner the invention may be utilized with power systems not directly associated with utility distribution facilities. Utilizing the principles of the invention, for example, encoded signals may be received and transmitted over the power line grid serving a plurality of individual wells in an oil field. In such manner the performance of pumps or so forth at individual wells may be monitored; and similarly signals may be provided to the wells to control pumping rates, etc.

While the present invention has been particularly set forth in terms of specific embodiments thereof, it will be understood in view of the instant disclosure, that numerous variations upon the invention are now enabled to those skilled in the art, which variations yet reside within the scope of the present teaching. Accordingly, the invention is to be broadly construed, and limited only by the scope and spirit of the claims now appended hereto.

We claim:

1. A system for remote reading of data measured by consumption meters, comprising in combination:

a plurality of consumption meters, positioned at selected field points, each said meter including means for translating the readings thereof into one of a plurality of digitally encoded forms;

means at each of said meters for modulating the carrier with said encoded data;

means for coupling said modulated carrier onto the power network of the community in which said meters are located;

a central control station coupled to said power network, for providing address signals to said meters;

said meters including address return means; and said central station including means for evaluating the address transmission characteristics of said power network, and means for applying control signals to said power network for selection of one of said encoded forms at said meters, for varying the mode of data transmission in response to the detected transmission characteristics of said network.

2. A system in accordance with claim 1, including a plurality of first satellite means, members of said plurality of satellites being coupled through said network to groups of said consumption meters.

3. A system in accordance with claim 2, further including second satellite means coupling said first satellite means to said central station through said power network.

4. A system in accordance with claim 3, further including third satellite means, coupling said central station to said second satellite means through said power network, and thereby to said first satellite means and said plurality of consumption meters.

5. A system in accordance with claim 2, wherein said satellite means includes buffer storage means for storing meter readings for subsequent transmission to said central control station.

6. A system in accordance with claim 1, wherein said translating means at said meters varies the rate of data transmission in response to said control signals.

7. A system in accordance with claim 1, wherein said means for evaluating the transmission characteristics of said power network, include means for comparing the transmitted and re-transmitted addresses, means for detecting the error rate indicated by said compared addresses, and means responsive to the error rate for varying the control signal to said translating means to maintain said error rate beneath some pre-established value.

* * * * *